United States Patent [19]

Kako

[11] Patent Number: 4,588,352
[45] Date of Patent: May 13, 1986

[54] MULTISTAGE HYDRAULIC MACHINE

[75] Inventor: Takuya Kako, Kawasaki, Japan

[73] Assignee: Kabushiki Kaisha Toshiba, Kawasaki, Japan

[21] Appl. No.: 721,910

[22] Filed: Apr. 10, 1985

[30] Foreign Application Priority Data

Apr. 12, 1984 [JP] Japan ................................ 59-71770
Apr. 12, 1984 [JP] Japan ................................ 59-71771

[51] Int. Cl.$^4$ ............................................ F04D 29/00
[52] U.S. Cl. ...................................... 415/110; 415/1; 415/500
[58] Field of Search ............... 415/1, 116, 170 R, 500, 415/106, 110, 111, 112

[56] References Cited

U.S. PATENT DOCUMENTS

| | | | |
|---|---|---|---|
| 3,237,565 | 3/1966 | Hartland | 415/1 |
| 3,516,757 | 6/1970 | Baumann | 415/1 |
| 3,927,951 | 12/1975 | Mitsuhashi | 415/110 |
| 4,179,237 | 12/1979 | Ogiwara et al. | 415/1 |
| 4,406,577 | 9/1983 | Ichikawa | 415/116 |
| 4,468,167 | 8/1984 | Ogiwara et al. | 415/500 |
| 4,547,123 | 10/1985 | Ichikawa | 415/500 |

FOREIGN PATENT DOCUMENTS

| | | | |
|---|---|---|---|
| 53-47 | 1/1978 | Japan | 415/500 |
| 27748 | 3/1978 | Japan | 415/500 |
| 142436 | 11/1979 | Japan | 415/500 |
| 57-5564 | 1/1982 | Japan | . |
| 188776 | 11/1982 | Japan | 415/112 |

*Primary Examiner*—Robert E. Garrett
*Assistant Examiner*—John Kwon
*Attorney, Agent, or Firm*—Oblon, Fisher, Spivak, McClelland & Maier

[57] ABSTRACT

A multistage hydraulic machine including a main shaft, a main shaft sealing device, and plural runners mounted on the main shaft and containing water at different pressure levels. A top cover is mounted on the highest pressure stage runner and in the space therebetween there is provided a labyrinth-type intermediate sealing device which defines a first space between the cover, the intermediate sealing device, and the runner and a second space between the intermediate sealing device, the cover and the main shaft. Exhaust passages are provided in communication with the first and second spaces for exhausting compressed air during changeover from one operation to another. The second space exhaust passage is capable of communicating with a lower pressure runner. The intermediate sealing device and the exhaust passages prevent water at the pressure of the highest pressure runner from communicating with the main shaft sealing device.

15 Claims, 13 Drawing Figures

MULTISTAGE HYDRAULIC MACHINE

BACKGROUND OF THE INVENTION

This invention relates to a multistage hydraulic machine, and more particularly to a multistage hydraulic machine to be operated in a pumping mode of operation or in a synchronous condenser mode of operation.

In general, a hydraulic turbine or a pump-turbine coupled directly to a synchronous generator is required to perform an in-air operation such that adjustable wicket gates and inlet valves are fully closed so as to pressurize the water by means of compressed air thereby to depress the water around runners. This occurs either when a synchronous condensor mode of operation is carried out in order to compensate for a decline in power factor in a power system, or when a pumping mode of operation is carried out during startup of a pump operation. In a multistage hydraulic machine including plural pressure stages varying from a high pressure stage to a lowest pressure stage which are interconnected by so-called return passages and with a set of adjustable wicket gates respectively provided with outwardly arranged runners within the respective stage chambers, when such a water pressurizing operation is carried out, it is essentially required to perform smoothly a return operation from a water pressurizing operation to a turbine-pump operation. To that end, air exhausting passages are provided opening toward an inner surface side as possible with respect to the respective water flow passages of runners within the respective stage chambers.

Referring FIG. 1, an example of a two-stage pump-turbine of a conventional multistage hydraulic machine will be described. FIG. 1 shows a state upon the return from a water pressurizing operation to a normal operation such as a turbine operation or a pump operation. In FIG. 1, reference numeral 1 designates a main shaft mounting two runners such as a high pressure stage runner 2 and a low pressure stage runner 3. A spiral casing 4 is provided outwardly from the high pressure stage runner 2. A set of adjustable wicket gates 5 of a high pressure stage are provided in a flow passage between the spiral casing 4 and the high pressure stage runner 2. Further, a top cover 7 is provided through a specified space 6 to a back portion of the high pressure stage runner 2. A top cover side runner seal 9 and a lower cover side runner seal 10 are provided respectively between the top cover 7 and the high pressure stage runner 2, and also between a lower cover 8 provided downward of the high pressure stage runner 2 and the high pressure stage runner 2 for the purpose of sealing pressurized water that flows thereinto from the water flow passage so as to lower the pressure thereof. A main shaft sealing device 11 is provided between the main shaft outer surface near a portion on which the highest pressure stage runner 2 is mounted and the top cover inner surface opposing the main shaft outer surface in order to prevent pressurized water within the back portion space 6 from leaking out through the outer surface of the main shaft 1. A communicating passage 12 is provided in the high pressure stage runner 2 by which the water flow passage of the high pressure stage runner 2 communicates with the back portion space 6. An air exhausting pipe 13 is provided with the top cover 7 and has one end opening in the back portion space 6 and its other end extending to the external portion. A control valve (not shown) is provided with the air exhausting pipe 13 and opens upon the return from a water pressurizing operation to a normal operation so as to form an air exhausting passage that exhausts compressed air within the high pressure stage runner chamber.

The low pressure stage runner chamber and the high pressure stage runner chamber are interconnected by a return passage 14, and a set of adjustable wicket gates 15 are provided in the return passage 14 outwardly of the low pressure stage runner 3. Between the low pressure stage runner and a fixed portion, there are formed runner seals which are similar to those of the high pressure stage. However, a communicating passage 16 is provided inside the main shaft 1 extending from a water flow passage of the low pressure stage runner 3 to an external portion. On the extension of the communicating passage 16, there is connected an air exhausting pipe (not shown) coupled to a control valve which is to be opened upon the return from a water pressurizing operation to a normal operation, thus forming an air exhausting passage that exhausts the compressed air within the low pressure stage runner chamber. Further, a draft tube 17 is provided downward of the low pressure stage runner 3 communicating to a tailrace (not shown).

In the conventional multistage hydraulic machine with the aforementioned structure, as the compressed air is exhausted to perform the return from a water pressurizing operation to a normal operation, the water surface is raised within the respective stage runners, and since the respective stage runners mounted on the main shaft 1 are rotated, water that has reached the respective runners is repelled toward an outer circumferential side of the respective stage runner chambers, from which water is becoming filled. In this case, exhaust passages provided with the respective stages are opened in the inner circumferential side of the water flow passages of the respective stage runners, so that the compressed air does not remain in the respective stage runner chambers but is exhausted through exhaust passages toward the external portion in directions shown by the arrows in FIG. 1. This can achieve a return operation from a water pressurizing depressing operation to a normal operation with no problem.

However, after an operation mode has once returned to a normal operation, since the water flow passage of the high pressure stage runner 2 and the runner back portion space 6 are communicated by the communicating passage 6, with respect to the runner back portion space 6, there is exerted an outlet pressure of the high pressure stage runner 2, that is, a pressure which as high as half the total head when operated as a turbine or a pump. Therefore, the main shaft sealing device 11 must seal such high pressure water filled within the runner back portion space 6, and is inevitably exposed to an extremely harsh operational condition. As a result, there is experienced severe wear of packings that constitute the main shaft sealing device 11, and in the worst case there is a danger of packing-burning and damage of the main shaft 1. So this has been a serious problem.

To alleviate the water pressure exerted on the main shaft sealing device 11, countermeasures even while in normal operation have been considered, such as opening the control valve provided with the air exhausting pipe 13 so as to drain the pressurized water of the runner back portion space 6 through the air exhausting pipe 13, or especially providing a water draining pipe (not shown) that has an opening in the runner back portion space 6 and communicates with an external portion so as drain pressurized water of the runner back portion space 6. However, even with such countermeasures, there still remains the problem that in order to alleviate the water pressure exerted on the main shaft sealing device 11, a considerably large amount of water need be drained, and this causes a decline in the efficiency of turbine operation and pump operation. The aforementioned problem becomes more remarkable as the total head is increased.

SUMMARY OF THE INVENTION

Accordingly, a primary object of the present invention is to provide a highly reliable multistage hydraulic machine, which is able to perform a smooth return operation from a water pressurizing operation to a normal operation, and includes an air exhausting passage that exhausts compressed air, but does not cause a decline in efficiency in turbine operation and pump operation.

Another object of the invention is to provide a multistage hydraulic machine, which is capable of alleviating water pressure exerted on the main shaft seal even when operating conditions are varied.

These and other objects are achieved according to the present invention by providing a novel multistage hydraulic machine including a main shaft, a number of runners ranging from a highest pressure stage runner to a lowest pressure stage runner mounted on the main shaft, a top cover provided mounted on a predetermined back portion of a highest stage runner, a top cover side runner sealing device provided between the top cover and the highest pressure stage runner, a main shaft sealing device provided between a main shaft outer surface near a portion on which the highest pressure stage runner is mounted and a top cover inner surface opposing the main shaft outersurface, an intermediate sealing device provided between the top cover side runner sealing device and the main shaft sealing device for providing sealing between the top cover and the highest pressure stage runner, a first transfer passage provided in the highest pressure stage runner by which a water flow passage of the highest pressure stage runner is communicated with a first back portion space between the top cover side runner sealing device and the intermediate sealing device, a first air exhausting passage provided in the top cover and opening to the first back portion space, a second transfer passage for providing communication between a water flow passage of the lowest pressure stage runner with a second back portion space existing between the main shaft sealing device and the intermediate sealing device, and a second air exhausting passage opening the second passage.

BRIEF DESCRIPTION OF THE DRAWINGS

A more complete appreciation of the invention and many of the advantages thereof will be more fully appreciated as the same becomes better understood from the following detailed description when considered in connection with the accompanying drawings, wherein.

DESCRIPTION OF THE PREFFERED EMBODIMENTS

Figure 1:
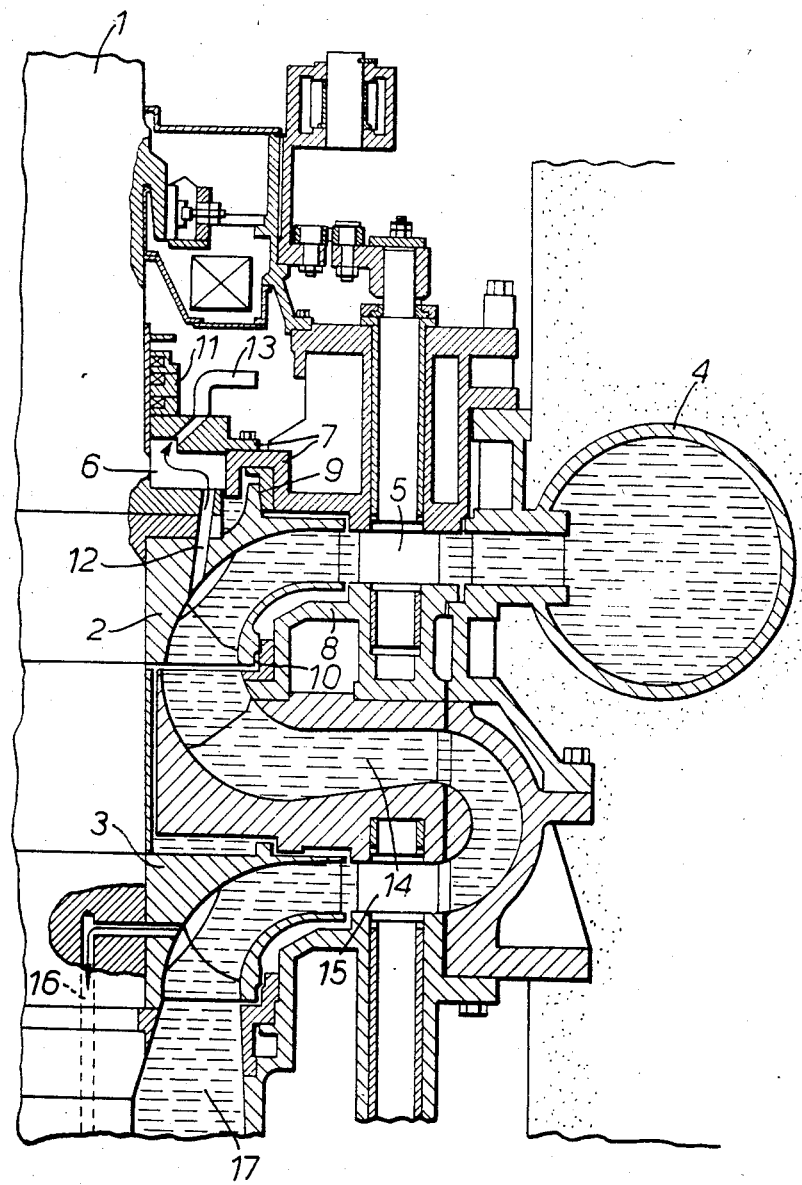
FIG. 1 is a vertical cross-sectional view of a conventional two-stage hydraulic machine.

For simplifying the description, the invention will be described with respect to a two-stage reversible pump-turbine shown in FIGS. 2 and 3 which constitutes a first embodiment of the present invention. Hereinafter, portions identical with those shown in FIG. 1 are designated by identical reference numerals, so that explanations thereof are omitted, and in general in the drawings, like reference numerals designate identical or corresponding parts throughout the several views.

Figure 2:
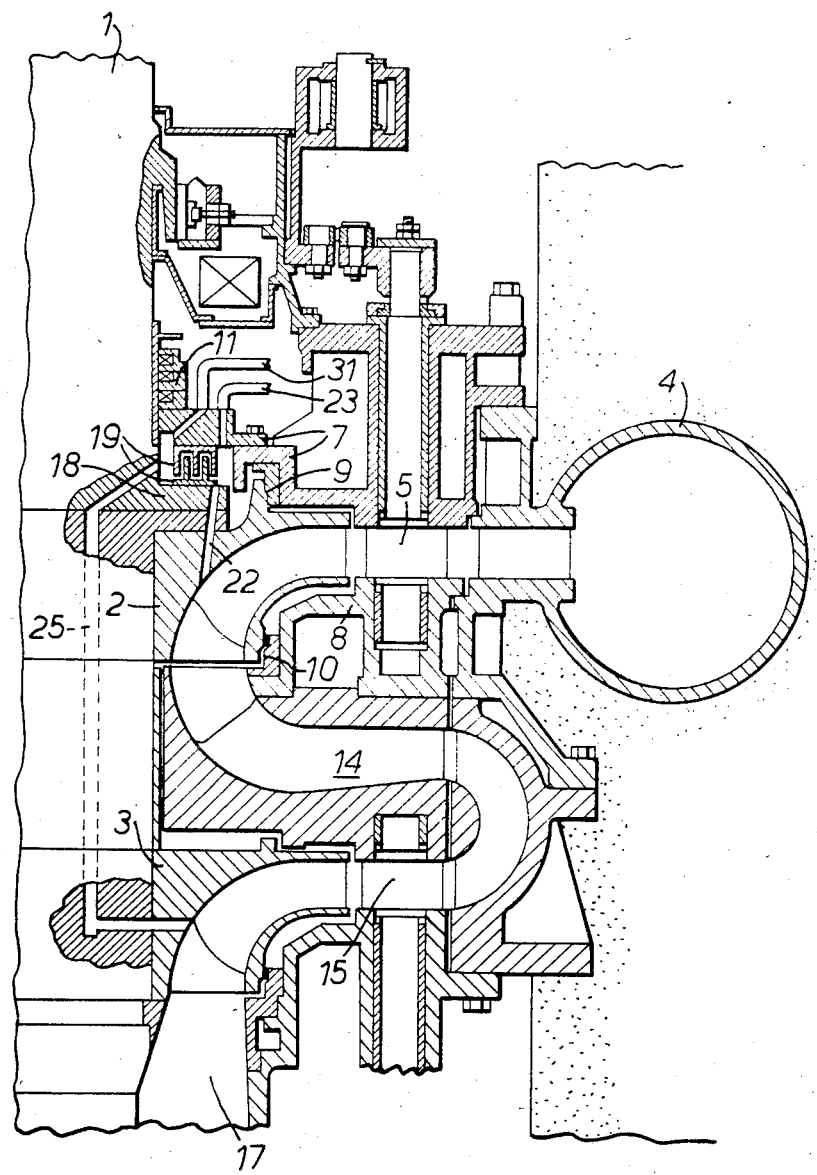
FIG. 2 is a vertical cross-sectional view of a two-stage pump-turbine constituting a first embodiment of the present invention.
Figure 3:
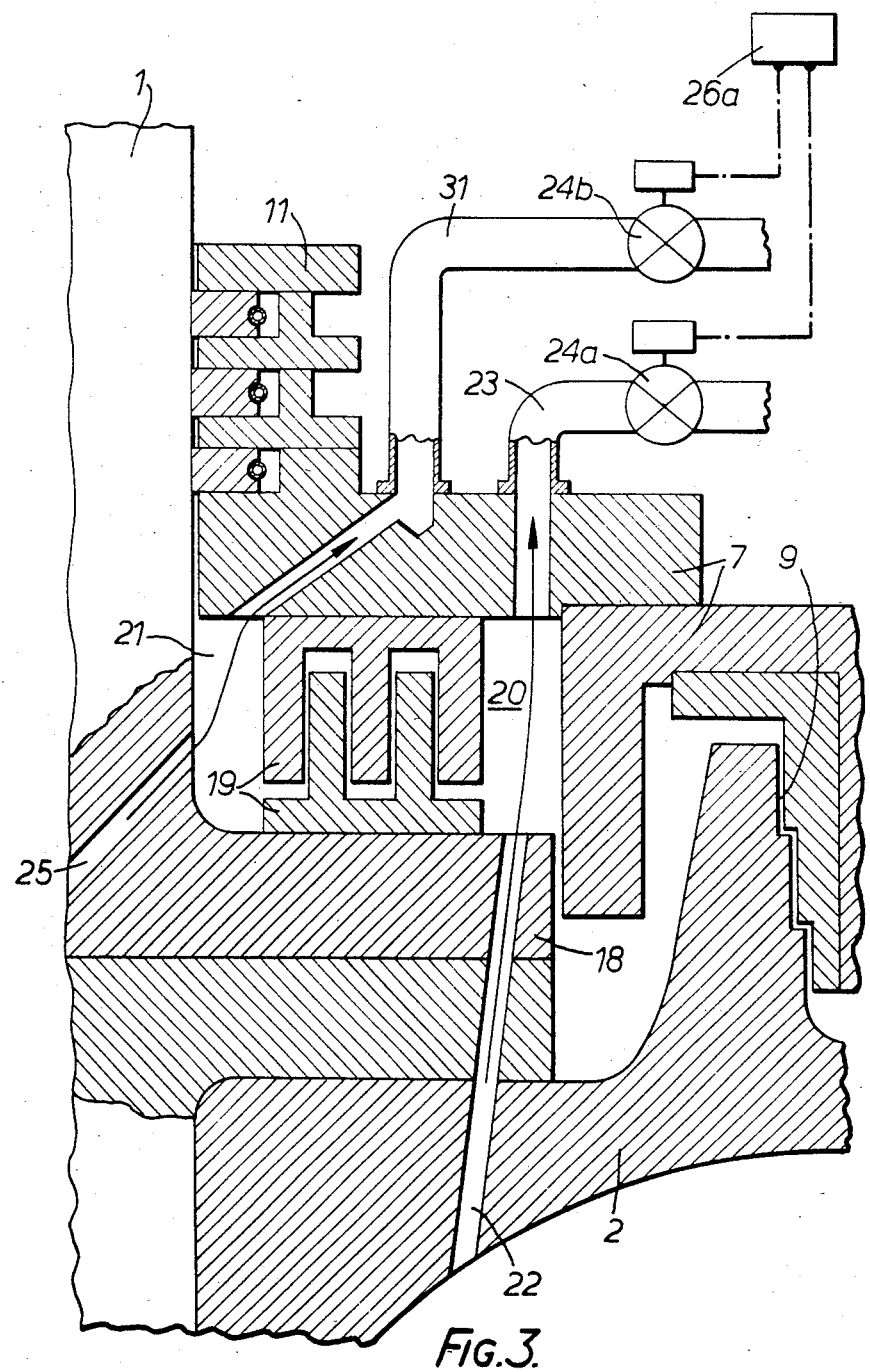
FIG. 3 is a vertical cross-sectional view, in a much enlarged scale, of an air exhausting region formed in the pump-turbine shown in FIG. 2.

Referring now to FIG. 2 and 3, an intermediate sealing device 19 of labyrinth type is provided within the back portion space 6 intermediate between a top cover side runner sealing portion 9 and a main shaft sealing device 11, and provides sealing between a rotatable shaft flange 18 and a fixed top cover 7. The back portion space 6 is partitioned by the intermediate sealing device 19 so as to form a first back portion space 20 of the top cover side runner sealing portion 9 side and a second back portion space 21 of the main shaft sealing device 11 side. A first passage such as communicating passage 22 is provided between the flow passage of the high pressure stage runner 2 and the back portion space 20 of the top cover side runner sealing portion 9 side. With the top cover 7 there is provided a first air exhausting device such as exhaust pipe 23 which has an opening at one end thereof with respect to the first back portion space 20 and extends to an external portion. The exhaust pipe 23 is provided with a first control valve 24a that opens at least upon the return from a water pressurizing operation to a normal operation, thus forming an air exhausting passage that extends externally from the water flow passage of the high pressure stage runner 2 through the first back portion space 20.

On the other hand, a second passage such as communicating passage 25 is provided within the main shaft 1 and opens with respect to the water flow passage of the low pressure stage runner 3 and the second back portion space 21. A second air exhausting device such as air exhausting pipe 31 is provided with the top cover 7 and has one end opening with respsect to the second back portion space 21 and its other end extending to the external portion. The air exhausting pipe 31 is provided with a second control valve 24b that opens at least upon the return from a water pressurizing operation to a normal operation, thus forming an air exhausting passage that extends externally from the water flow passage of the low pressure stage runner 3 through the back second portion space 21. Further, the two control valves 24a and 24b are connected to a first control apparatus 26a to be controlled so as to dependently or independently perform an open-close operation.

In the multistage hydraulic machine with the aforementioned structure, when compressed air within the runner chambers is exhausted in order to return from water pressurizing operation to a normal operation, compressed air is exhausted to the external portion through the aforementioned passages such as the communicating passage 22, the first back portion space 20, the air exhausting pipe 23, the communicating passage 25, the second back portion space 21 and the air exhausting pipe 31, so that the return operation from a water pressurizing operation to a normal operation can be performed with no problem.

Moreover, after the return to a normal operation, even when water at a pressure as high as the outlet pressure of the high pressure stage runner 2 is filled within the first back portion space 20 through the communicating passage 22, only a pressure as low as the outlet pressure of the low pressure stage runner 3 is invariably exerted on the main shaft sealing device 11, because the second back portion 21 is communicated with the water flow passage of the low pressure stage runner 3 through the communicating passage 25, and in addition, the two back portion spaces 20 and 21 are partitioned by the intermediate sealing device 19. Thus, a pressure as high as half the total head is not exerted on the main shaft sealing device 11 as in the conventional multistage hydraulic machines. In this case, a portion of the high pressure water filled within the first back portion space 20 is drained to the outlet of the low pressure stage runner 3 through the intermediate sealing device 19 and the communicating passage 25 while the remaining of the water within the first back portion space 20 is drained to the external portion through the intermediate sealing device 19 and the main shaft sealing device 11. However, since the water is sealed by the intermediate sealing device 19, the drainage quantity thereof is small. Thus, the decline in efficiency in turbine operation and pump operation can be avoided.

When the first control apparatus 26a is provided for controlling the open-close operations of the two control valves 24a and 24b, the two control valves 24a and 24b can be freely opened or closed in accordance with the operating conditions. Therefore, even when water pressure within the second back portion space 21 is raised abnormally higher, the control apparatus 26a controls the second control valve 24b to be opened so as to drain water within the second back portion space 21 to the external portion in supplementary manner, thus alleviating the pressure to be exterted on the main shaft sealing device 11, so that a multistage hydraulic machine with enhanced reliability can be obtained. In addition, there are provided such advantages that the first control apparatus 26a can also adjust when to open the two control valves 24a and 24b and the opening degrees thereof so that the order of air exhausting of the respective stage runner chambers can be readily arranged.

Next, the second embodiment of the present invention will be described with reference to FIGS. 4 and 5. The difference between the second embodiment and the first embodiment shown in FIGS. 2 and 3 is that with the top cover 7 there is provided a second passage such as communicating pipe 30 which has openings at the both ends thereof to communicate the second back portion space 21 with the draft chamber 17. The communicating pipe 30 is provided with a third control valve 24c that opens at least during normal operations. A second exhausting means such as communicating pipe 32 is provided within the main shaft 1 extending from a water flow passage of the low pressure stage runner 3 to an external portion. On the extention of the communicating passage 16 there is connected an air exhausting pipe (not shown) provided for a second control valve which is to be opened upon the return from a water pressurizing operation to a normal operation, thus forming an air exhausting passage that exhausts the compressed air within the low pressure stage runner. In this embodiment, the same advantages as described in the first embodiment can be obtained.

Next, the third embodiment of the present invention will be described with the reference to FIGS. 6 and 7. The difference between the third embodiment and those embodiments shown in FIGS. 2, 3, 4 and 5 is that an exhausting shelf 28 is provided in the top cover 7 for forming a space 27 whose outer portion is opening in the first back portion space 20. There is also provided the intermediate sealing device 19 that seals between the air exhausting shelf 28 and the rotatable main shaft flange 18. Further the air exhausting pipe 23 is provided with the top cover 7 and opens into the space 27.

Figure 7:
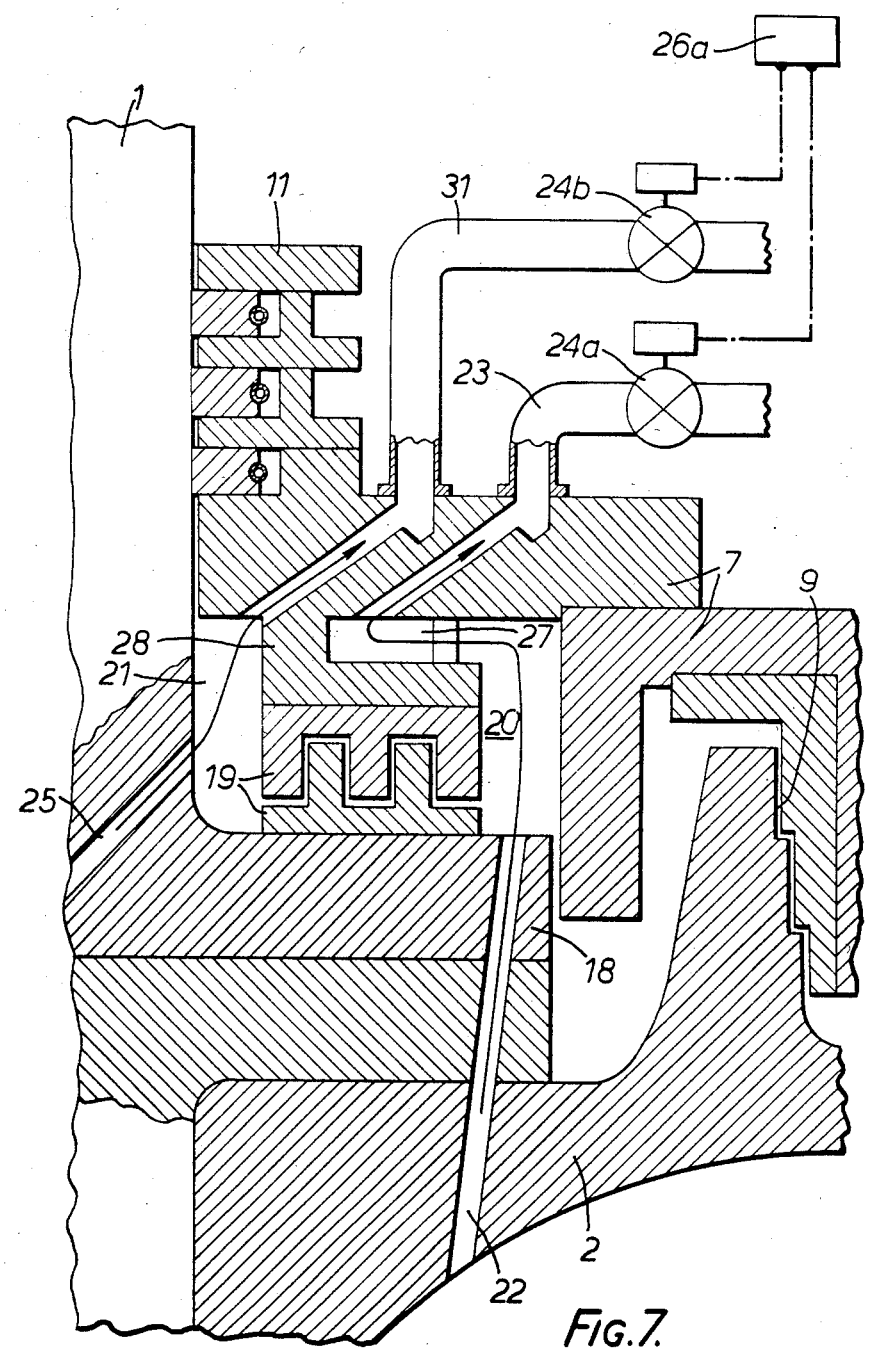
FIG. 7 is a vertical cross-sectional view, in a much enlarged scale, of an air exhausting region formed in the pump-turbine shown in FIG. 6.

In a multistage hydraulic machine with the aforementioned structure, when compressed air filled within the high pressure stage runner chamber is exhausted in order to return from a water pressurizing operation to a normal operation, compressed air is exhausted to the external portion through the communicating passage 22, the first back portion space 20, the space 27 and the exhausting pipe 23 in the direction of the arrow shown in FIG. 7, so that advantages identical with those in the aforementioned embodiments can be obtained.

Furthermore, in this embodiment there are additionally provided such advantages as described below. In general, the main shaft sealing device 11 is penetrated with foreign substances such as mud and sand which are mixed with river water within the runner chambers, so that the packings that constitute the main shaft sealing device 11 can be abnormally worn. To prevent this, fresh water is supplied into the shaft sealing region such that a portion of the fresh water is leaked to the runner side while the remaining water is leaked out toward the upper atmospheric side. In this case, when water leaked from the main shaft sealing device 11 to the second back portion space 21 becomes excessive, some problems can occurred upon the return from a water pressurizing operation to a normal operation. Namely, when the leaked water penetrates through the second back portion space 21 and the intermediate sealing device 19 into the first back portion space 20, a water detection device (not shown) provided with the air exhausting pipe 23 can function, despite the fact that air exhausting has not been completed, so as to erroneously close the first control valve 24a. Thus there is a danger of developing a retardation of exhausting air in the runner chamber. However according to the third embodiment shown in FIGS. 6 and 7, there is provided the air exhausting shelf 28, so that upon the return from a water pressurizing operation to a normal operation, even when water leaked from the main shaft sealing device 11 penetrates into the first back portion space 20 in which a centrifugal force produced by the rotation thereof causes water to be filled from the outer surface wall thereof, the opening of the air exhausting pipe 23 exists within the space 27, and this can reduce the danger in which water mixed with air in the air exhausting pipe 23a causes the water detection device to operate erroneously.

Next, the fourth embodiment of the present invention will be described with reference to FIGS. 8 and 9. In this embodiment, which is similar to the second embodiment shown in FIGS. 4 and 5, an exhausting shelf 28 is provided in the top cover 7 to form the space 27 whose outer portion opens into the first back portion space 20. The same advantages as described in the third embodiment can thereby be obtained.

Next, the fifth embodiment of the present invention will be described with reference to FIGS. 10, 11, 12 and 13. The difference betwen the embodiment shown in FIGS. 10 through 13, from those shown in FIGS. 2 through 9 is that there is provided a water draining pipe 29 that has one end open to the inside of the intermediate sealing device 19 and its other end open toward an external portion. A control valve 24d is provided for the water draining pipe 29 opening at least upon the return from a water pressurizing operation to a normal operation.

Figure 10:
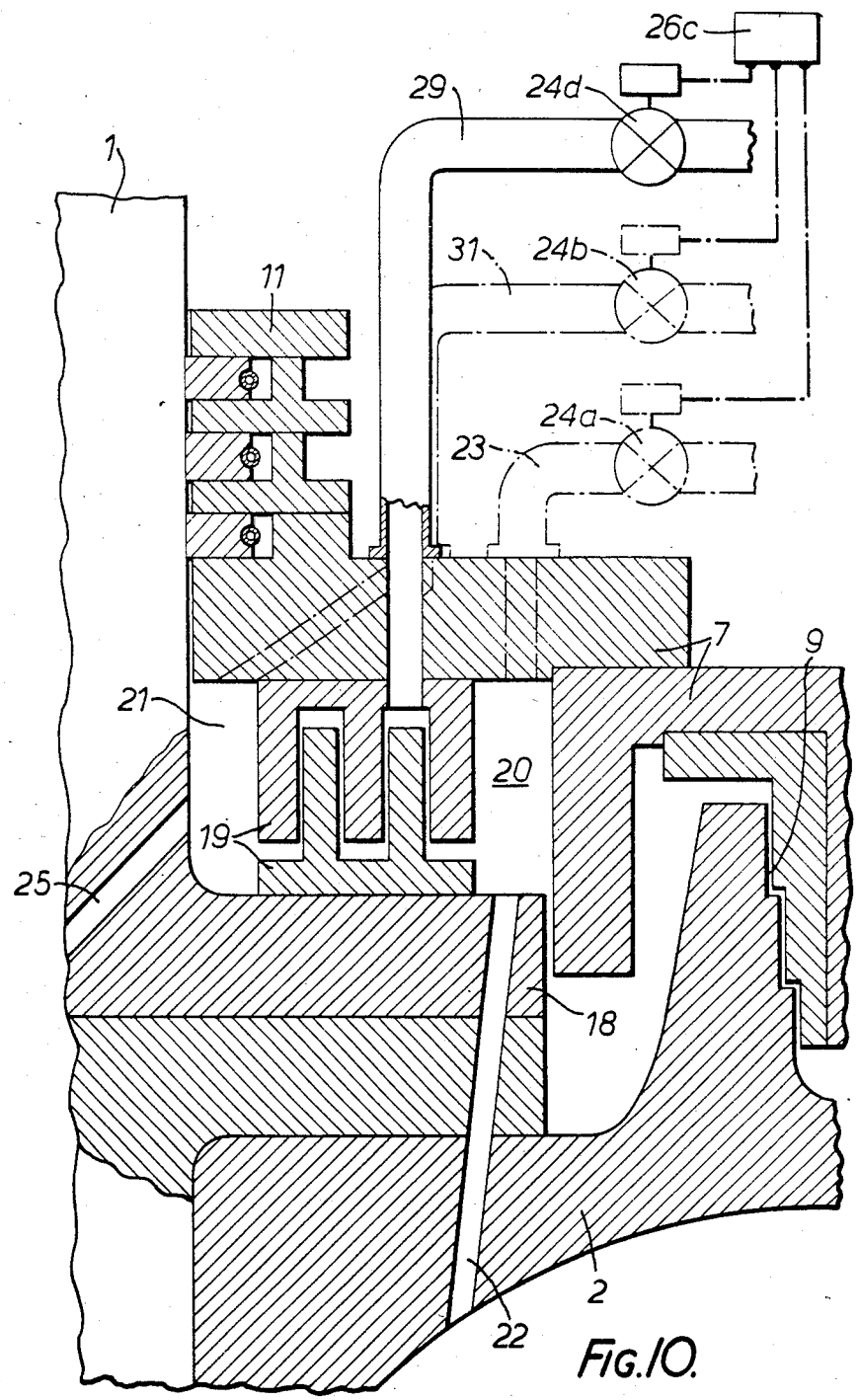
FIGS. 10, 11, 12 and 13 are vertical cross-sectional views, in much enlarged scale, of portions of a fifth embodiment of the invention, for indicating an air exhausting region formed in the pump-turbine according to the invention.

In the embodiment shown in FIG. 10, the water draining pipe 29 with the control valve 24d is further provided to the structure of the first embodiment shown in FIGS. 2 and 3. Then there is provided a third control apparatus 26c that controls the control valves 24a, 24b and 24d so as to independently or dependently perform open-close operations in accordance with the operating conditions.

Figure 4:
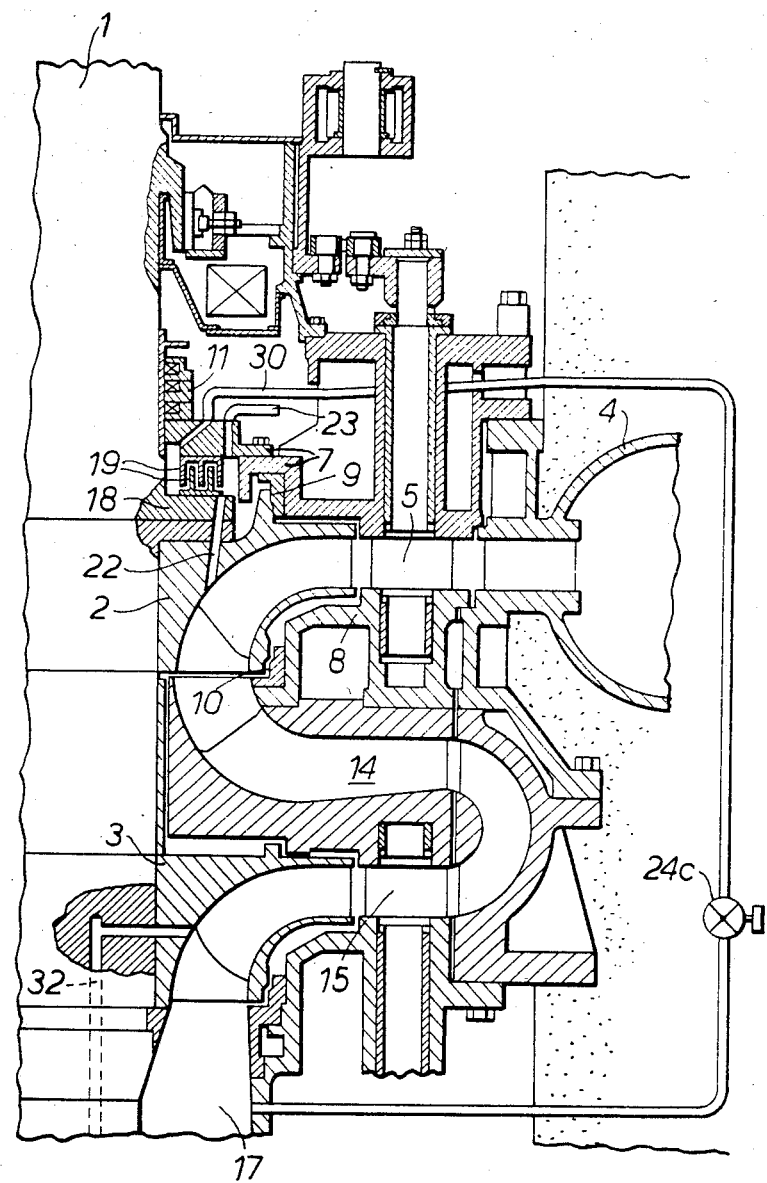
FIG. 4 is a vertical cross-sectional view of a two-stage pump-turbine constituting a second embodiment the invention.
Figure 5:
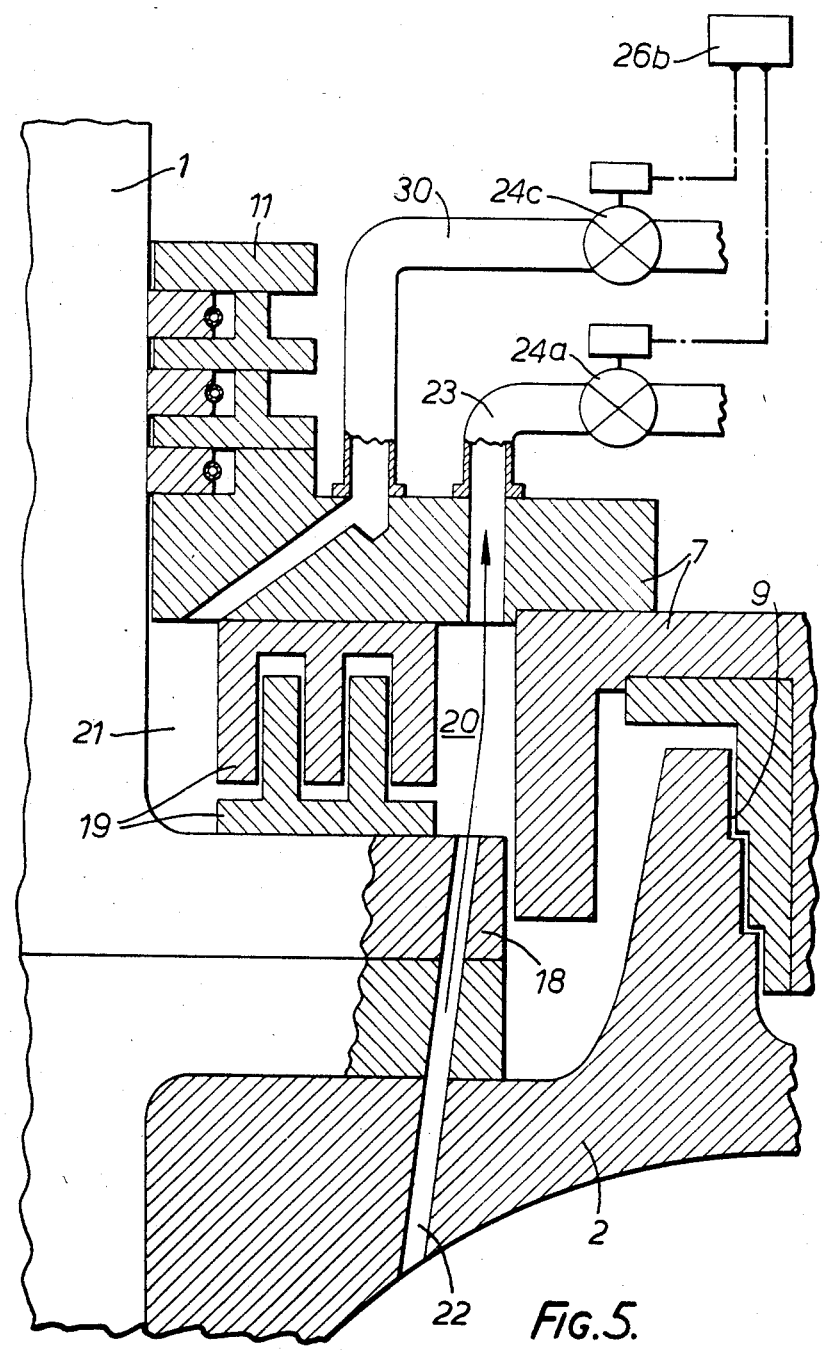
FIG. 5 is a vertical cross-sectional view, in much enlarged scale, of an air exhausting region formed in the pump-turbine shown in FIG. 4.
Figure 11:
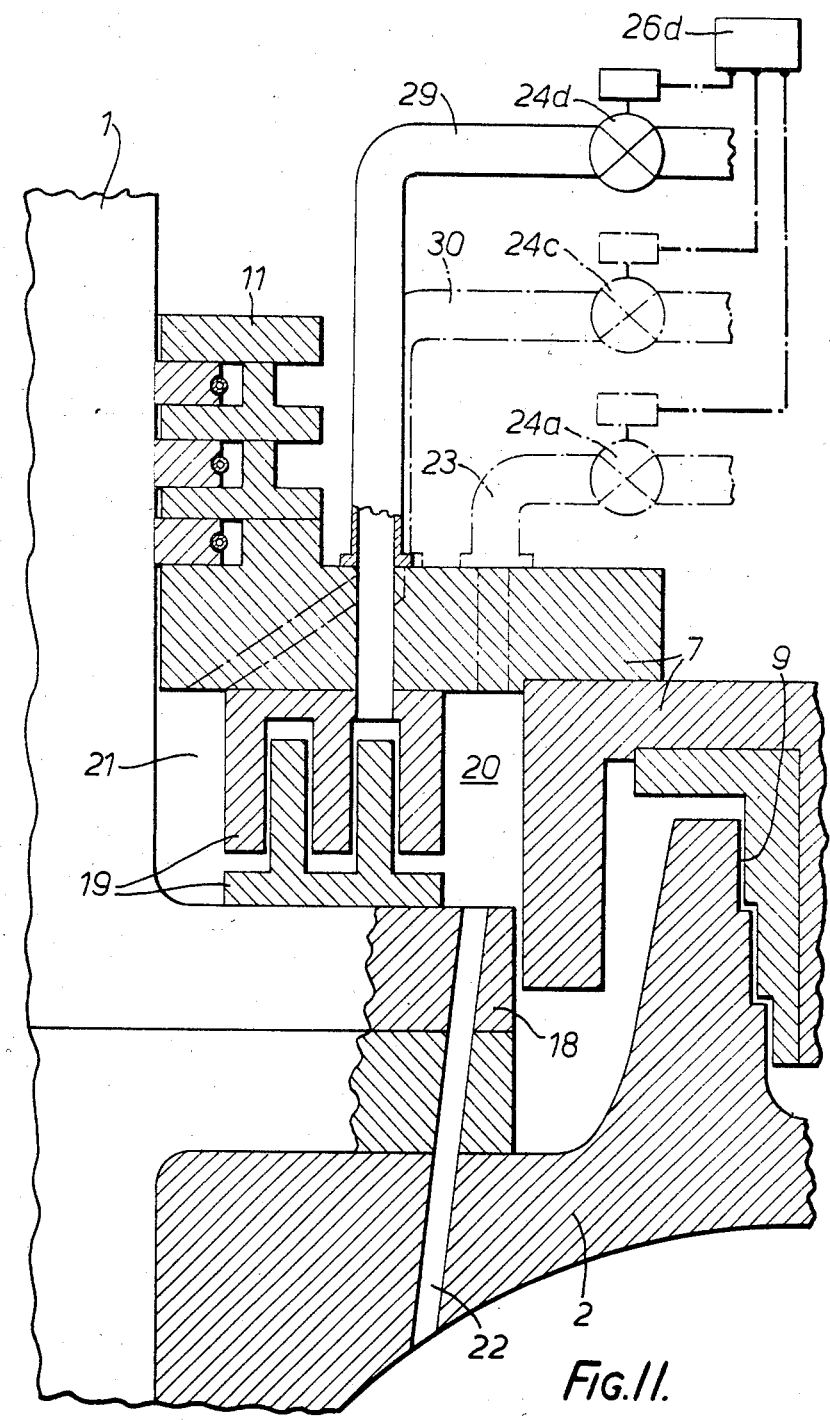

In the embodiment shown FIG. 11, the water draining pipe 29 with the control valve 24d is further added to the structure of the second embodiment shown in FIGS. 4 and 5. Also provided is a fourth control apparatus 26d that controls the control valves 24a, 24c and 24d so as to independently or dependently perform open-close operations in accordance with the operating conditions.

Figure 6:
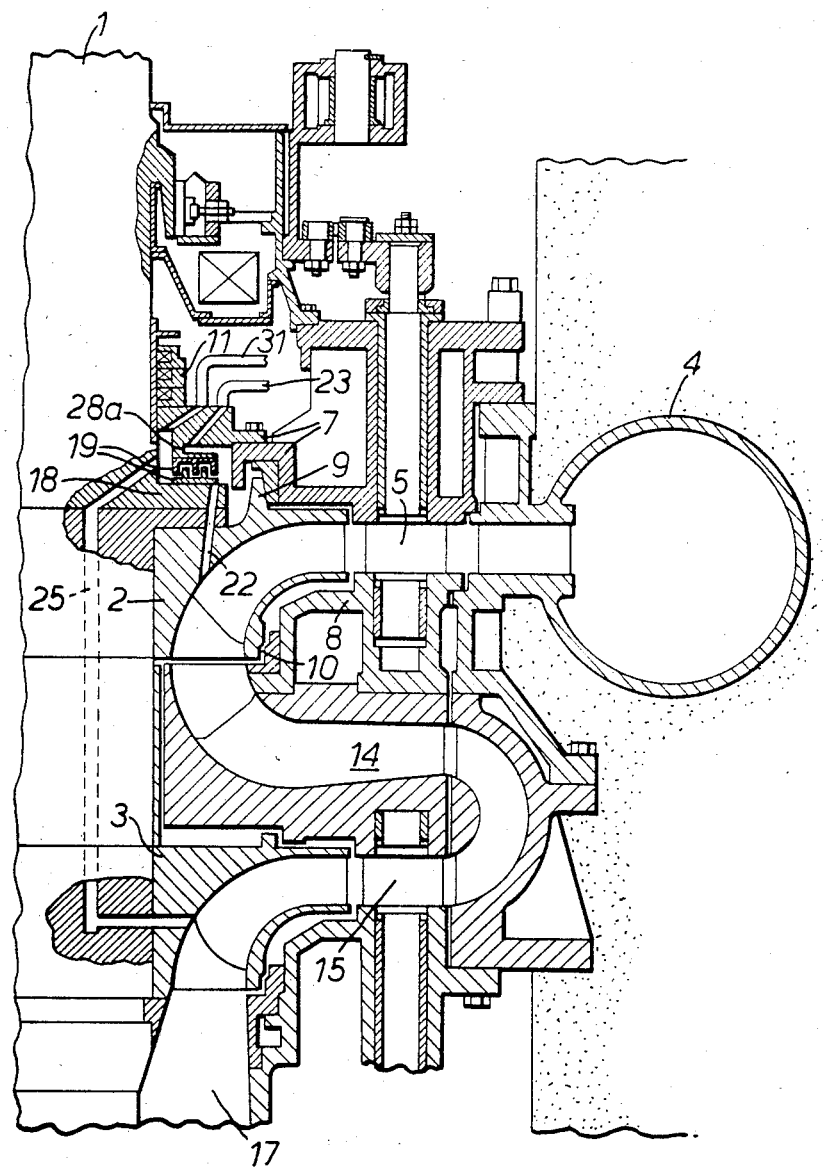
FIG. 6 is a vertical cross-sectional view of a two-stage pump-turbine constituting a third embodiment of the invention.
Figure 12:
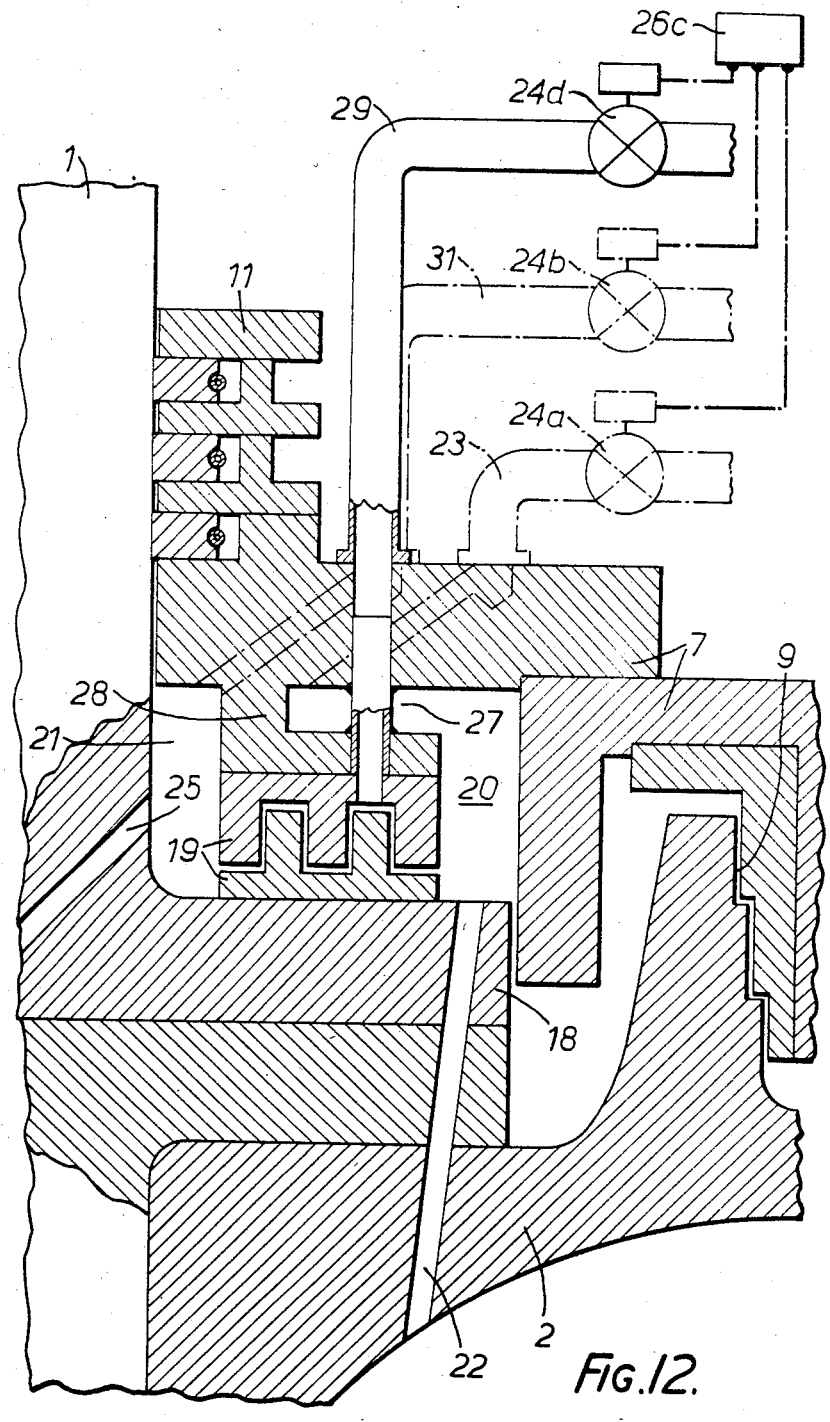

In the embodiment shown FIG. 12, the water draining pipe 29 with control valve 24d is further added to the structure of the third embodiment shown in FIGS. 6 and 7. Then, there is also provided a third control apparatus 26c that controls the control valves 24a, 24b and 24d so as to independently or dependently perform open-close operations in accordance with the operating conditions.

Figure 8:
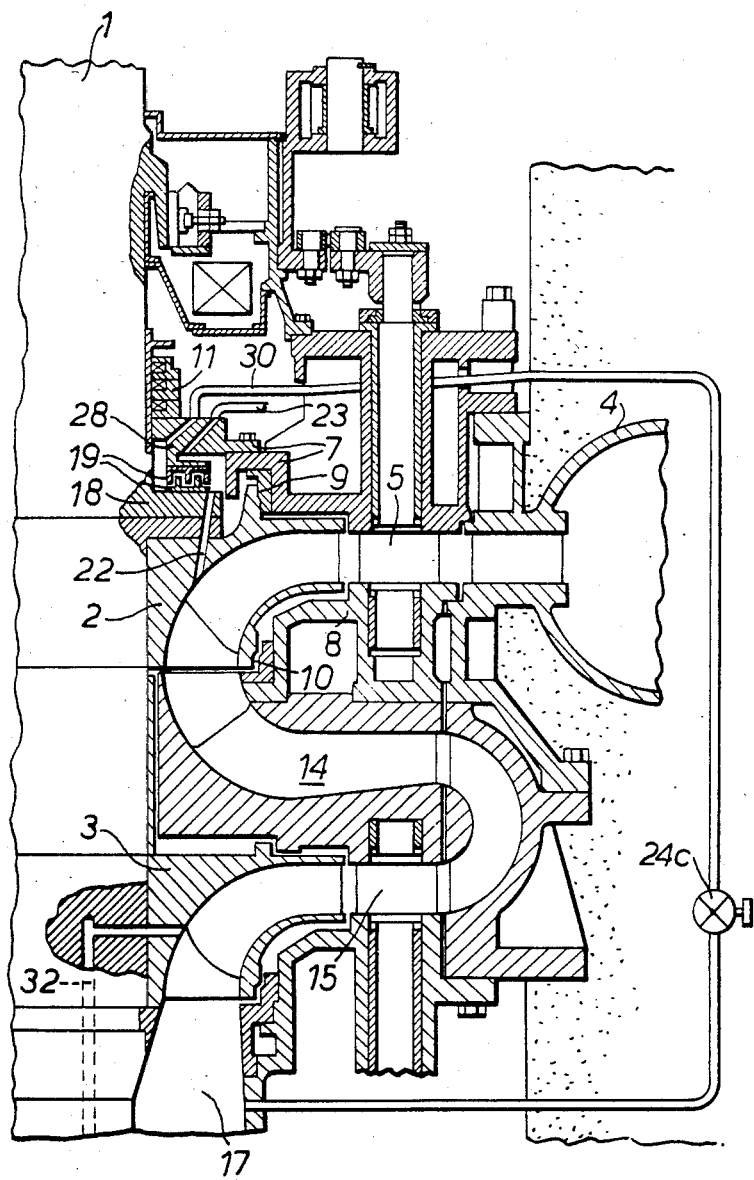
FIG. 8 is a vertical cross-sectional view of a two-stage pump-turbine constituting a fourth embodiment of the invention.
Figure 9:
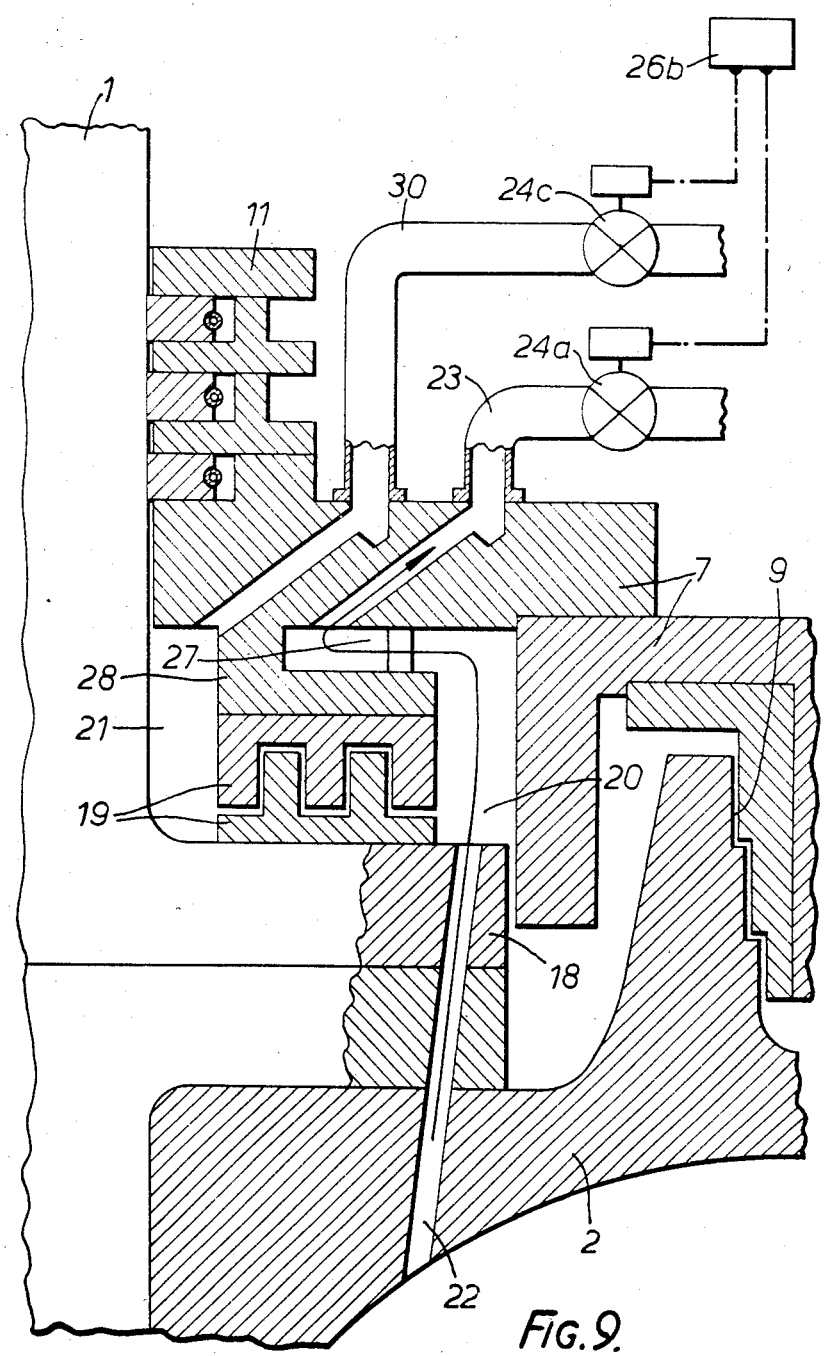
FIG. 9 is a vertical cross-sectional view, in a much enlarged scale, of an air exhausting region formed in the pump-turbine shown in FIG. 8.
Figure 13:
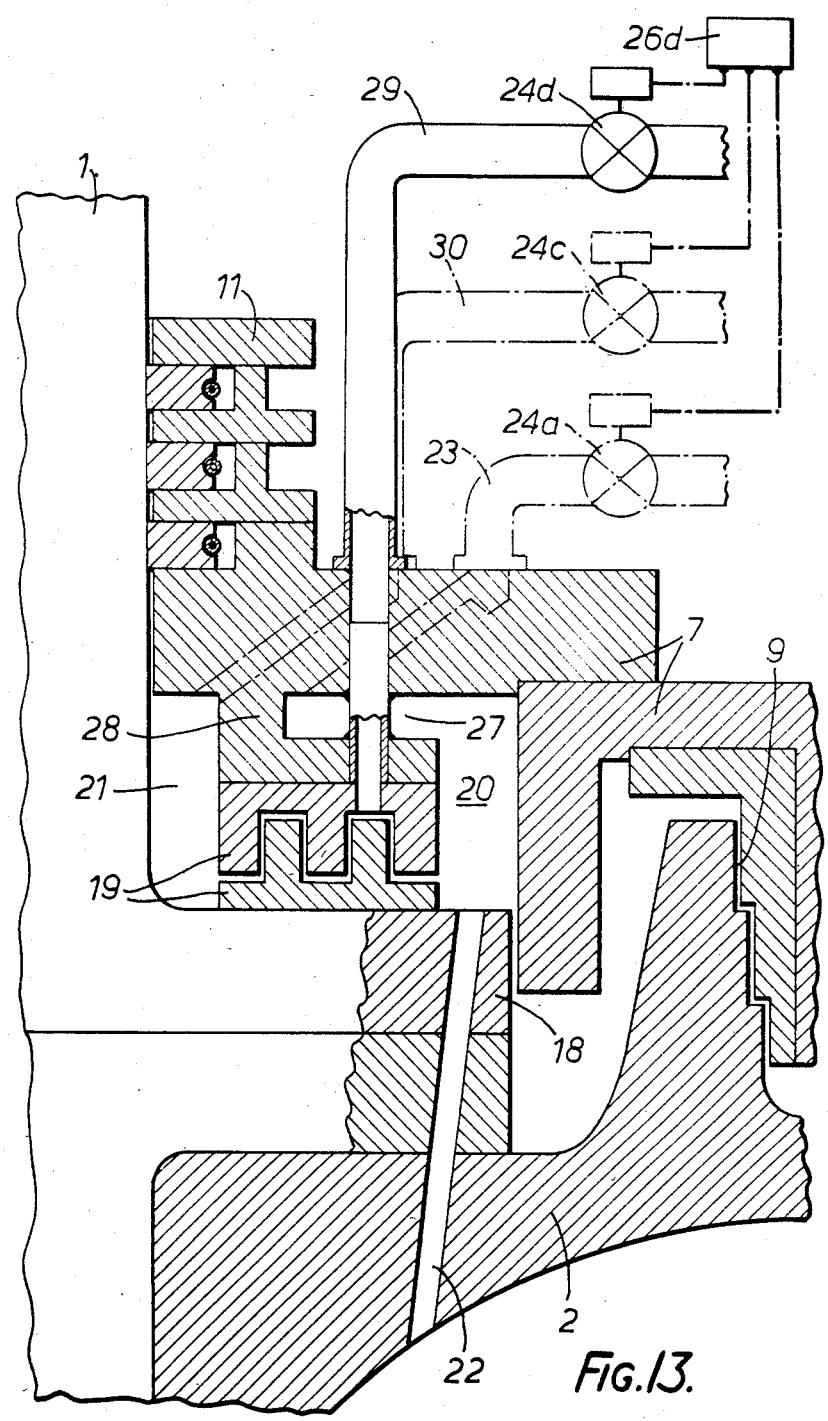

In the embodiment shown FIG. 13, the water draining pipe 29 with the control valve 24d is further added to the structure of the fourth embodiment shown in FIGS. 8 and 9. Then, there is provided a third control apparatus 26d that controls the control valves 24a, 24c and 24d so as to independently or dependently perform open-close operations in accordance with the operating conditions.

In the multistage hydraulic machine with the aforementioned structure, as described in the embodiments shown in FIGS. 10 through 13, when fresh water is supplied to the sealing region of the main shaft sealing device 11 and the leaked water attempts to penetrate into the air exhausting pipe 23 through the second back portion space 21, the intermediate sealing device 19, and the first back portion space 20 upon the return from a water pressurizing operation to a normal operation, the water leaked from the main shaft sealing device 11 is drained to an external portion through the water draining pipe 29, so that the leaked water can be prevented from penetrating into the air exhausting pipe 23. Therefore, a retardation of exhausting air in the runner chamber caused by erroneous operations of the water detection apparatus as a result of the leaked water penetrating into the air exhausting pipe 23 can be nipped in the bud.

Further, for instance, even when the water pressure within the second back portion space 21 is abnormally raised by some causes during a normal operation, the pressure exerted on the main shaft sealing device can be alleviated because the respective control apparatus 26c, 26d causes the control valve 24d to be opened so as to drain the water to an external portion.

Obviously, numerous modification and variations of the present invention are possible in light of the above teachings. It is therefore to be understood that within the scope of the appended claims, the invention may be practiced otherwise than as specifically described herein.

What is claimed as new and desired to be secured by letters patent of the united states is:

1. A multistage hydraulic machine comprising:
   a main shaft;
   plural runners ranging from a highest pressure stage runner to a lowest pressure stage runner mounted on said main shaft;
   a top cover mounted on a predetermined part of a back portion of the highest pressure stage runner;
   top cover side runner sealing means for providing sealing between the top cover and the highest pressure stage runner;
   a main shaft sealing device provided between an outer surface of the main shaft near where the highest pressure stage runner is mounted and an inner surface of the top cover opposing said main shaft outer surface;
   an intermediate sealing device provided between said top cover side runner sealing means and said main shaft sealing device for providing sealing between the top cover and the highest pressure stage runner;
   a first passage provided in the highest pressure stage runner for providing communication between a water flow passage of the highest pressure stage runner and a first back portion space located between said top cover side runner sealing means and said intermediate sealing device;
   first means for exhausting air provided with said top cover thereby to communicate with said first back portion space;
   a second passage providing communication between a water flow passage of the lowest pressure stage runner and a second back portion space located between said main shaft sealing device and said intermediate sealing device;
   second means for exhausting air in communication with said second passage;
   whereby said first and second passages and said intermediate sealing device prevent water at the pressure within said highest pressure stage runner from communicating with said main shaft sealing device.

2. A multistage hydraulic machine as set forth in claim 1, wherein said second air exhausting means has an opening in communication with the water flow passage of the lowest pressure stage runner and is formed in said main shaft.

3. A multistage hydraulic machine as set forth in claim 1, wherein said second passage is formed in said main shaft, and said second air exhausting means is provided in communication with an opening of said top cover to communicate with said second back portion.

4. A multistage hydraulic machine as set forth in claim 1, which further comprises:
an air exhausting shelf provided in said top cover for forming a space having an outer portion in communication with said first back portion space, and wherein said first air exhausting means is in communication with said space formed by said exhausting shelf.

5. A multistage hydraulic machine as set forth in claim 1, which further comprises:
means provided with said top cover in communication with said intermediate sealing device for draining water from said intermediate sealing device.

6. A multistage hydraulic machine as set forth in claim 1, which further comprises:
first and second control valves connected to said first and second air exhausting means, respectively, and capable of opening at least from a water pressurizing operation to a normal operation.

7. A multistage hydraulic machine as set forth in claim 1, further comprising:
a control valve connected to said second passage and capable of opening at least during a normal operation.

8. A multistage hydraulic machine as set forth in claim 5, which further comprises:
a control valve connected to said water draining means and capable of opening at least from a water pressurizing operation to a normal operation.

9. A multistage hydraulic machine as set forth in claim 6, which further comprises:
a first control apparatus controlling said first and second control valves so as to perform an open-close operation in accordance with operation conditions.

10. A multistage hydraulic machine as set forth in claim 5, which further comprises:
first and second control valves connected to said first and second air exhausting means, respectively, and capable of opening at least from a water pressurizing operation to a normal operation.

11. A multistage hydraulic machine as set forth in claim 10, which further comprises:
a control valve connected to said water draining means and capable of opening at least from a water pressurizing operation to a normal operation.

12. A multistage hydraulic machine as set forth in claim 11, which further comprises:
a first control apparatus controlling said first and second control valves so as to perform an open-close operation in accordance with operation conditions.

13. A multistage hydraulic machine as set forth in claim 5, further comprising:
a control valve connected to said second passage and capable of opening at least during a normal operation.

14. A multistage hydraulic machine as set forth in claim 13, which further comprises:
a control valve connected to said water draining means and capable of opening at least from a water pressurizing operation to a normal operation.

15. A multistage hydraulic machine as set forth in claim 14, which further comprises:
a first control apparatus controlling said first and second control valves so as to perform an open-close operation in accordance with operation conditions.

* * * * *